(12) United States Patent
Krishnan (10) Patent No.: US 12,386,168 B2
(45) Date of Patent: Aug. 12, 2025

(54) MICROSCOPE SYSTEM AND CORRESPONDING SYSTEM, METHOD AND COMPUTER PROGRAM FOR A MICROSCOPE SYSTEM

(71) Applicant: Leica Instruments (Singapore) Pte. Ltd., Singapore (SG)

(72) Inventor: Tushar Krishnan, Singapore (SG)

(73) Assignee: Leica Instruments (Singapore) Pte Ltd., Singapore (SG)

(*) Notice: Subject to any disclaimer, the term of this patent is extended or adjusted under 35 U.S.C. 154(b) by 229 days.

(21) Appl. No.: 18/000,686

(22) PCT Filed: May 20, 2021

(86) PCT No.: PCT/EP2021/063530
§ 371 (c)(1),
(2) Date: Dec. 5, 2022

(87) PCT Pub. No.: WO2021/249736
PCT Pub. Date: Dec. 16, 2021

(65) Prior Publication Data
US 2023/0176355 A1    Jun. 8, 2023

(30) Foreign Application Priority Data
Jun. 8, 2020 (DE) .......................... 102020115194.2

(51) Int. Cl.
*G02B 21/36* (2006.01)
*G02B 21/00* (2006.01)

(52) U.S. Cl.
CPC ....... *G02B 21/365* (2013.01); *G02B 21/0076* (2013.01); *G02B 21/008* (2013.01)

(58) Field of Classification Search
CPC . G02B 21/365; G02B 21/0076; G02B 21/008
See application file for complete search history.

(56) References Cited

FOREIGN PATENT DOCUMENTS

| DE | 19853407 A1 | * | 5/2000 | ......... G02B 21/0024 |
|---|---|---|---|---|
| DE | 102008049878 A1 | | 4/2010 | |
| DE | 102014107445 A1 | * | 12/2015 | ............. A61B 90/20 |
| EP | 3748413 A1 | * | 12/2020 | ............. G02B 21/16 |
| EP | 4057047 A1 | * | 9/2022 | ......... G02B 21/0012 |
| EP | 3805834 B1 | * | 12/2023 | ............. A61B 90/20 |
| JP | H10090779 A | | 4/1998 | |
| JP | 2018202162 A | | 12/2018 | |
| WO | WO 2010/037487 A1 | * | 1/2006 | ............. G02B 21/00 |
| WO | 2017223206 A1 | | 12/2017 | |

* cited by examiner

*Primary Examiner* — David P Porta
*Assistant Examiner* — Fani Polyzos Boosalis
(74) *Attorney, Agent, or Firm* — SPL Patent Attorneys PartG mbB; Yong Beom Hwang (57) ABSTRACT

Examples relate to a microscope system (100; 400) and to a corresponding system (110), method and computer program for a microscope system. The system comprises one or more processors (114) and one or more storage devices (116). The system is configured to determine a quality indicator of a quality of image data of a fluorescence imaging sensor (122) of a microscope (120) of the microscope system. The system is configured to identify, for one or more user settings of the microscope, a range of values that are suitable in view of the quality indicator. The system is configured to control a change of the one or more user settings based on the range of values that are suitable in view of the quality indicator.

15 Claims, 3 Drawing Sheets

MICROSCOPE SYSTEM AND CORRESPONDING SYSTEM, METHOD AND COMPUTER PROGRAM FOR A MICROSCOPE SYSTEM

TECHNICAL FIELD

Examples relate to a microscope system and to a corresponding system, method, and computer program for a microscope system.

BACKGROUND

Modern microscope systems, in particular surgical microscope systems, offer a wide variety of functionality to assist the user (i.e. surgeon) during operation of the microscope. One of the functionalities provided by some surgical microscopes is a "fluorescence imaging" functionality, in which light is emitted towards the surgical site in a first wavelength band (also called the fluorescence excitation wavelength band). If a fluorescent dye is used in the surgical site, the emitted light excites the dye, and light is emitted in a second wavelength band (also called the fluorescence emission wavelength band). This light can be recorded by a camera sensor, and displayed on a display of the surgical microscope, e.g. on a display of an ocular of the surgical microscope. Compared with reflectance imaging, light that is emitted by the fluorescent dye has a low illumination intensity, which may limit the ability to digitally process the recording of the light in the fluorescence emission wavelength band.

SUMMARY

There may be a desire for am improved concept for fluorescence imaging.

This desire is addressed by the subject-matter of the independent claims.

Embodiments of the present disclosure are based on the finding, that, concerning fluorescence imaging, there are a variety of functions or parameters of the microscope that have an influence on the quality of the image data of the fluorescence imaging sensor, such as the zoom level, working distance of the surgical microscope from the surgical site and the illumination of the surgical site. In some surgical microscopes, during fluorescence imaging, a change to these parameters and functions is limited, to make sure enough headroom remains for processing the fluorescence image data, which may limit the availability of the respective functionalities or parameters even if the quality of the fluorescence image data is sufficient to support the respective functionalities or parameters. Therefore, in various embodiments of the present disclosure, the quality of the image data of the fluorescence imaging sensor is analyzed to determine, which user settings can be safely changed, and the change of these user settings is controlled based on the analysis.

Embodiments of the present disclosure provide a system for a microscope of a microscope system. The system comprises one or more processors and one or more storage devices. The system is configured to determine a quality indicator of a quality of image data of a fluorescence imaging sensor of the microscope. The system is configured to identify, for one or more user settings of the microscope, a range of values that are suitable in view of the quality indicator. The system is configured to control a change of the one or more user settings based on the range of values that are suitable in view of the quality indicator. By determining the range of values that are suitable in view of the quality indicator, and controlling the change of the user settings based on the range of values, the range of values can be extended compared to a system which uses a static range of values allowable during fluorescence imaging operation of the microscope.

For example, the system may be configured to limit the change of the one or more user settings to the range of values that are suitable in view of the quality indicator. In other words, the user may be prevented from changing the one or more user settings to values that are not suitable for use in a fluorescence imaging operation of the microscope.

Additionally or alternatively, the system is configured to provide a notification via an output device if a change of the one or more user settings outside the range of values that are suitable in view of the quality indicator is attempted. Based on the notification, the user can be made aware that the change in the one or more user settings is not recommended, or even prevented (if the change of the one or more user settings is limited).

In some examples, the system is configured to delay the change of the one or more user settings when the notification is provided. This way, the user (e.g. the surgeon) can change their mind before the changed user settings are applied.

In various embodiments, the quality indicator relates to a light intensity of fluorescence emissions within the image data. For example, the quality indicator may relate to a maximal light intensity of the fluorescence emissions within the image data, or to an average light intensity of the fluorescence emissions within the image data. In many cases, a sufficient light intensity is vital for successfully processing the image data.

The quality indicator may be defined over a range of values. The range of values may comprise a first sub-range and at least one second sub-range outside the first sub-range. The range of values that are suitable in view of the quality indicator may be limited if a value of the quality indicator is within the first sub-range. In other words, if the quality indicator is in the first sub-range, only changes that are likely to improve the quality indicator might be made available. On the other hand, the entire range of values may be accessible for the one or more user settings if the value of the quality indicator is within the at least one second sub-range, e.g. if the quality indicator is sufficiently good.

In various embodiments, the quality indicator is determined for a plurality of samples of the image data over a window of time. The range of values that are suitable in view of the quality indicator may be limited if, within the plurality of samples within the window of time, a number of samples that yield a quality indicator that lies within the first sub-range, is higher than a threshold value. In other words, single samples that indicate a low quality of the image data may be disregarded if there are a large enough number of samples that indicate a quality that is good enough.

For example, the first sub-range may be located between two second sub-ranges within the range of values. For example, in one of the second sub-ranges, the quality of the image data may be too low for processing, so any change of the user settings may be enabled, in the other of the second sub-ranges, the quality of the image data may be so high that, also, any change to one of the user settings is permissible. Merely in the middle between the two extremes, where the quality of the image data is still good enough for processing, the range of values may be limited.

In some embodiments, two or more quality indicators are determined separately for two or more non-overlapping frequency bands that are indicative of fluorescence emissions. The range of values may be suitable in view of the two or more quality indicators. While the quality indicators are determined separately for two frequency bands, and therefore two fluorescent dyes, the changes may affect both, so the range of values that should be used may be chosen such, that fluorescence imaging is fully supported in both frequency bands.

The one or more user settings may relate to one or more of a magnification factor of the microscope, a working distance of the microscope and a brightness of an illumination system of the microscope. These are user settings that generally influence the quality of the image data of the fluorescence imaging sensor. For these settings, the range of values may be limited into one direction from the current setting. For example, the range of values that is suitable for the magnification factor of the microscope may extend up to a current magnification factor of the microscope. The range of values that is suitable for the working distance of the microscope may extend up to a current working distance factor of the microscope. The range of values that is suitable for the brightness of the illumination system of the microscope may extend up from a current brightness of the illumination system. In other words, the range of values may be limited to values that are likely to improve the quality of the image data.

As has been mentioned before, the range of values that are suitable in view of the quality indicator may be suitable with regards to image processing being performed on the image data and/or with regards to a visualization of the image data on an output device. Post-processing and visualization of the image data may require a minimal quality to yield adequate results. Accordingly the system may be configured to perform image processing on the image data, and/or to provide a visualization of the image data, and to provide a display signal based on the processed image data or based on the visualization.

Embodiments of the present disclosure further provide a microscope system comprising the system and the microscope. For example, the microscope system may be a surgical microscope system. Accordingly, the microscope may be a surgical microscope.

Embodiments of the present disclosure further provide a corresponding method for a microscope of a microscope system. The method comprises determining a quality indicator of a quality of image data of a fluorescence imaging sensor of the microscope. The method comprises identifying, for one or more user settings of the microscope, a range of values that are suitable in view of the quality indicator. The method comprises controlling a change of the one or more user settings based on the range of values that are suitable in view of the quality indicator.

Embodiments of the present disclosure further provide a computer program with a program code for performing the method when the computer program is executed on a processor.

SHORT DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Figure 1A:
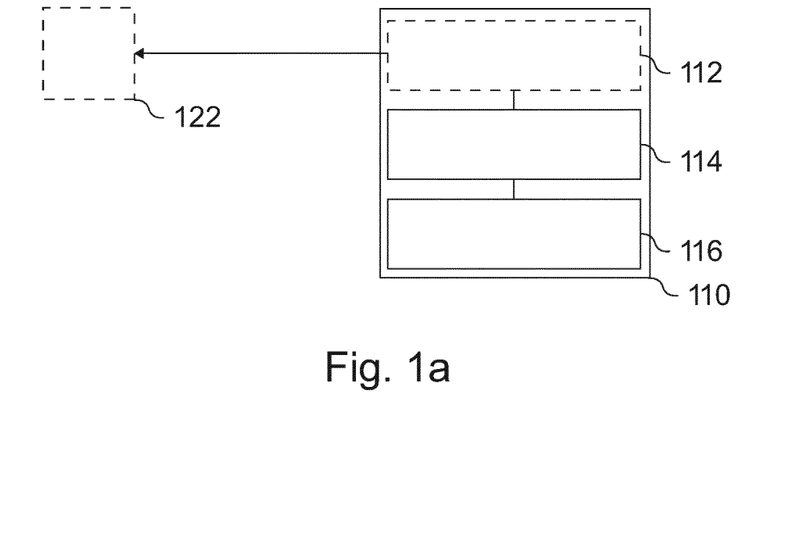
FIGS. 1a and 1b show schematic diagrams of embodiments of a system for a microscope of a microscope system and of a surgical microscope system comprising the system and the microscope.
Figure 1B:
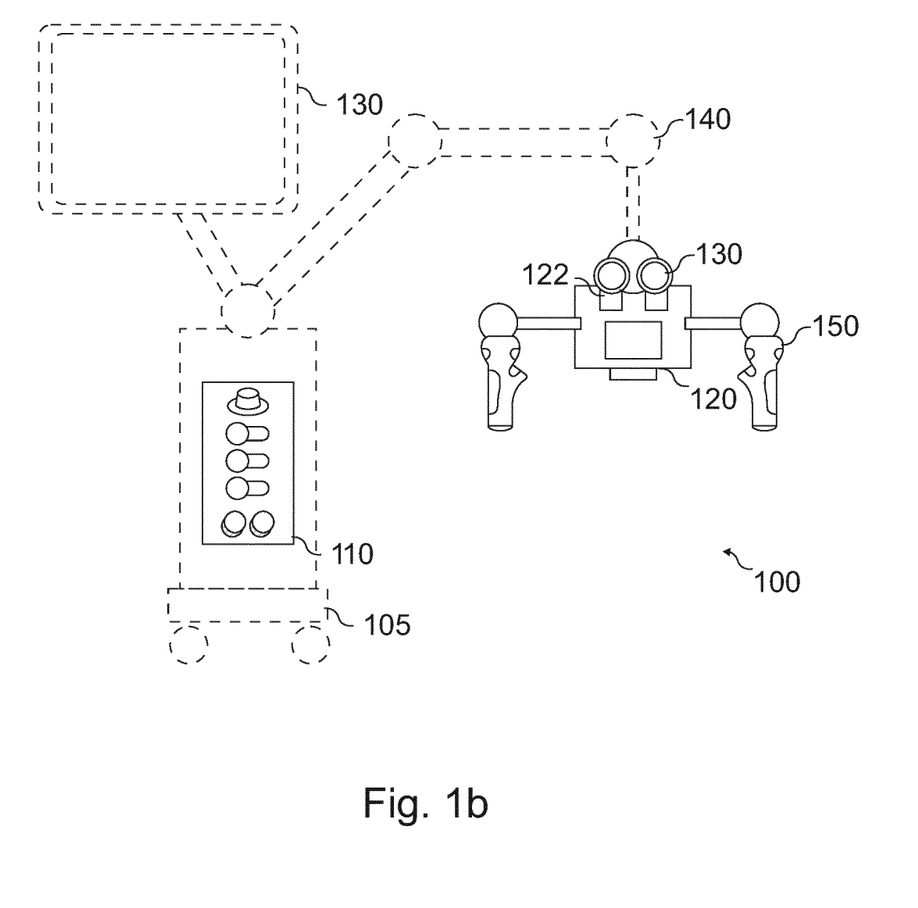

FIGS. 1a and 1b show schematic diagrams of embodiments of a system 110 for a microscope 120 of a microscope system 100 and of a surgical microscope system 100 comprising the system 110 and the microscope 12. The system 110 comprises one or more processors 114 and one or more storage devices 116. Optionally, the system further comprises an interface 112. The one or more processors 114 are coupled to the optional interface 112 and the one or more storage devices 116. In general, the functionality of the system 110 is provided by the one or more processors 114, e.g. in conjunction with the optional interface 112 and/or the one or more storage devices 116.

The system is configured to determine a quality indicator of a quality of image data of a fluorescence imaging sensor 122 of the microscope. The system is configured to identify, for one or more user settings of the microscope, a range of values that are suitable in view of the quality indicator. The system is configured to control a change of the one or more user settings based on the range of values that are suitable in view of the quality indicator.

FIG. 1b shows a block diagram of microscope system 100, in particular of a surgical microscope system 100, comprising the system 110. The microscope system 100 further comprises the microscope 120 with the fluorescence imaging sensor 122. The microscope system shown in FIG. 1b is a surgical microscope system, which may be used at a surgical site by a surgeon. The surgical microscope system shown in FIG. 1b comprises a number of optional components, such as a base unit 105 (comprising the system 110) with a (rolling) stand, one or more displays 130, such as an auxiliary display or ocular eyepieces, a (robotic or manual) arm 140 which holds the microscope 120 in place, and which is coupled to the base unit 105 and to the microscope 120, and steering handles 150 that are attached to the microscope 120. In the context of this application, the term "(surgical) microscope system" is used, in order to cover the portions of the system that are not part of the actual microscope (which comprises optical components), but which are used in conjunction with the microscope, such as the displays or a lighting system.

Embodiments of the present disclosure relate to a system, a method and a computer program that are suitable for a microscope 120 of a microscope system 100, such as the microscope system 100 introduced in connection with FIG. 1b. As has been introduced above, a distinction is made between the microscope 120 and the microscope system 100, with the microscope system comprising the microscope 120 and various components that are used in conjunction with the microscope 120, e.g. a lighting system, an auxiliary display etc. In a microscope system, the actual microscope is often also referred to as the "optical carrier", as it comprises the optical components of the microscope system. In general, a microscope is an optical instrument that is suitable for examining objects that are too small to be examined by the human eye (alone). For example, a microscope may provide an optical magnification of an object. In modern microscopes, the optical magnification is often provided for a camera or an imaging sensor. The microscope 120 may further comprise one or more optical magnification components that are used to magnify a view on the sample.

There are a variety of different types of microscopes. If the microscope system is used in the medical or biological fields, the object being viewed through the microscope may be a sample of organic tissue, e.g. arranged within a petri dish or present in a part of a body of a patient. For example, the microscope system 100 may be a microscope system for use in a laboratory, e.g. a microscope that may be used to examine the sample of organic tissue in a petri dish. Alternatively, the microscope 120 may be part of a surgical microscope system 100, e.g. a microscope to be used during a surgical procedure. Such a system is shown in FIG. 1b, for example. Although embodiments are described in connection with a microscope system, they may also be applied, in a more general manner, to any optical device. For example, the microscope system may be a system for performing material testing or integrity testing of materials, e.g. of metals or composite materials.

The system determines the quality indicator of the quality of the image data based on image data of a fluorescence imaging sensor 122 of the microscope. Consequently, the system may be configured to obtain image data of, or from, a fluorescence imaging sensor of the microscope. In general, the fluorescence imaging sensor may be an imaging sensor that is configured to (only) sense light in one or more fluorescence emission wavelength bands that are indicative of fluorescence emissions. In microscope systems, e.g. in surgical microscope systems, often one or more filters are used to implement a fluorescence imaging sensor and a reflectance imaging sensor, in combination with a corresponding lighting system. For example, the fluorescence imaging sensor may comprise one or more filters for blocking light outside the one or more fluorescence emission wavelength bands that are indicative of fluorescence emissions, e.g. around 560 nm, 630 nm, 800 nm for fluorescein, PPIX (Protoporphyrin IX) and ICG (Indo-Cyanine Green), which are different types of fluorescent dyes. The "normal" reflectance imaging sensor might comprise filters that block out light in the one or more fluorescence emission wavelength bands that are indicative of fluorescence emissions, or might not comprise corresponding filters. At the same time, a lighting system may be used that, if fluorescence imaging is performed, does not emit light in the one or more fluorescence emission wavelength bands, e.g. by using a further one or more filters to block out the light in the one or more fluorescence emission wavelength bands from the light emitted by the lighting system. The lighting system may be further used to emit light in one or more excitation wavelength bands of one or more fluorescent dyes.

In general, the fluorescence imaging sensor 122 may comprise an APS (Active Pixel Sensor)—or a CCD (Charge-Coupled-Device)-based imaging sensor. For example, in APS-based imaging sensors, light is recorded at each pixel using a photodetector and an active amplifier of the pixel. APS-based imaging sensors are often based on CMOS (Complementary Metal-Oxide-Semiconductor) or S-CMOS (Scientific CMOS) technology. In CCD-based imaging sensors, incoming photons are converted into electron charges at a semiconductor-oxide interface, which are subsequently moved between capacitive bins in the imaging sensor modules by a control circuitry of the sensor imaging module to perform the imaging. For example, the image data may comprise two-dimensional camera image data.

The system is configured to determine a quality indicator of a quality of the image data. In general, the quality of the image data relates to a visibility of fluorescence emissions in the image data. For example, the quality indicator may relate to a light intensity of fluorescence emissions within the image data, e.g. to an absolute light intensity of the fluorescence emissions, or to a light intensity relative to other light emissions being visible in the image data, e.g. of reflectance of stray light from an ambient lighting system being used in the operating room. Additionally or alternatively, the light intensity may refer to an absolute light intensity in terms of lumen, or to a relative light intensity in terms of amplitude of the sensitivity chosen for recording the image data. In some the quality indicator relates to a maximal (absolute or relative) light intensity of the fluorescence emissions within the image data, e.g. a maximally observed light intensity of at least one pixel of the image data observed, e.g. within a predefined timer interval. Alternatively, the quality indicator may relate to an average light intensity of the fluorescence emissions within the image data, e.g. an average light intensity of a plurality of pixels showing fluorescence emissions, e.g. over a pre-defined time interval. The quality indicator may indicate the quality of the image data with respect to the above (light intensity) metrics, e.g. over a range of values (such as between 0% and 100%). Consequently, the quality indicator may indicate, how suitable the image data is for the task at hand (the task at hand being image processing performed on the image data or visualization of the image data).

The system is configured to identify, for one or more user settings of the microscope, a range of values that are suitable in view of the quality indicator. The term "suitable in view of the quality indicator" has two parts—"suitable" and "in view of the quality indicator". In general, with respect to the microscope, the user settings may be suitable, if they allow for an unfettered use of the microscope, i.e. a use where every functionality is available (or at least not unavailable due to the quality of the image data). It also means that the one or more user settings have an influence of the image data, i.e. that the quality of the image data may change (e.g. improve or deteriorate) in response to a change of the one or more user settings. Therefore, a range of values of one or more user settings being suitable "in view of the quality indicator" indicates that the range of values is chosen such, that the range of values allows for an unfettered operation of the microscope in view of the quality indicator (or, if the quality is too low in any case, the entire range may also be available, in order to manually find values that enable an unfettered operation of the microscope).

In general, the suitability of the range of values may relate to any functionality of the microscope. In particular, however, the quality of the image data is especially relevant for two functionalities of the microscope system—image processing of the image data, and visualization of the image data. Therefore, the range of values that are suitable in view of the quality indicator may be suitable with regards to image processing being performed on the image data and/or with regards to a visualization of the image data on an output device. Both functionalities go hand in hand. For example, image processing may be performed on the image data in order to apply a color effect on fluorescence emissions caused by different fluorescent dyes, or to apply a color effect to visually differentiate between different blood vessels. This information may be overlaid over the unprocessed image data on a display 130 of the microscope system. For example, the system may be configured to perform image processing on the image data, e.g. to color the fluorescence emissions visible in the image data, and to provide a display signal (to a display 130 of the microscope system) based on the processed image data, thereby visualizing the fluorescence emissions on the display. For example, the system may be configured to provide the display signal based on further image data of an reflectance imaging sensor of the microscope, and to overlay the processed image data (with colors highlighting the fluorescence emissions) over the further image data in the display signal. For example, the system may be configured to obtain the image data and/or the further image data via the interface circuitry 112, and/or to provide the display signal via the interface circuitry 112. For example, the display signal may comprise a video stream or control instructions for the display 130.

As mentioned above, the quality indicator may be defined over a range of values. Depending on the position of the quality indicator among the range of values, different measures may be taken. For example, the range of values may comprise a first sub-range and at least one second sub-range outside the first sub-range. In other words, the at least one second sub-range might not overlap with the first sub-range. The first sub-range may be the sub-range of interest, as the quality indicator within the first sub-range may be considered good enough, but not so good that the one or more user settings can be freely changed. Accordingly, the range of values that are suitable in view of the quality indicator may be limited (only) if a value of the quality indicator is within the first sub-range. If the quality indicator is in the at least one second sub-range, the quality of the image data may be either very good (such that any change in a user setting yields image data that is suitable for processing or visualization) or very bad (such that the image data is currently not suitable for processing or visualization). Accordingly, the first sub-range may be located between two second sub-ranges within the range of values. Consequently, the range of values that are suitable in view of the quality indicator might not be limited if a value of the quality indicator is within the at least one second sub-range. In other words, he entire range of values may be accessible for the one or more user settings if the value of the quality indicator is within the at least one second sub-range.

There are various functionalities and user settings of the microscope that affect the image data of the fluorescence imaging sensor. For example, the one or more user settings (and therefore the functionalities of the microscope that relate to the respective settings) may relate to one or more of a magnification factor of the microscope (i.e. a zoom setting), a working distance of the microscope (i.e. the distance between the microscope and the sample/surgical site) and a brightness of an illumination system (e.g. a brightness of an illumination system with respect to emissions in one or more fluorescence excitation wavelength bands) of the microscope. For each of these functionalities/ user settings, a limitation of the range of values of the user settings may result in a range of user settings that may restrict the user settings to values that result in image data that is suitable for the task at hand, and/or that result in image quality with an improved quality indicator. For example, the range of values that is suitable for the magnification factor of the microscope may extend up to a current magnification factor of the microscope (as increasing the magnification factor may deteriorate the quality of the image data). The range of values that is suitable for the working distance of the microscope may extend up to a current working distance factor of the microscope (as a larger working distance may deteriorate the quality of the image data). The range of values that is suitable for the brightness of the illumination system (with regards to the fluorescence excitation wavelength bands) of the microscope may extend up from a current brightness of the illumination system.

In general, the quality indicator may be periodically updated, e.g. every 100 ms or every second. Accordingly, the range of values that are suitable in view of the quality indicator may be updated if the quality indicator changes, e.g. periodically or in response to (i.e. triggered by) a change of the quality indicator. In other words, both the quality indicator and the range of values that are suitable in view of the quality indicator may be dynamically updated.

Figure 3:
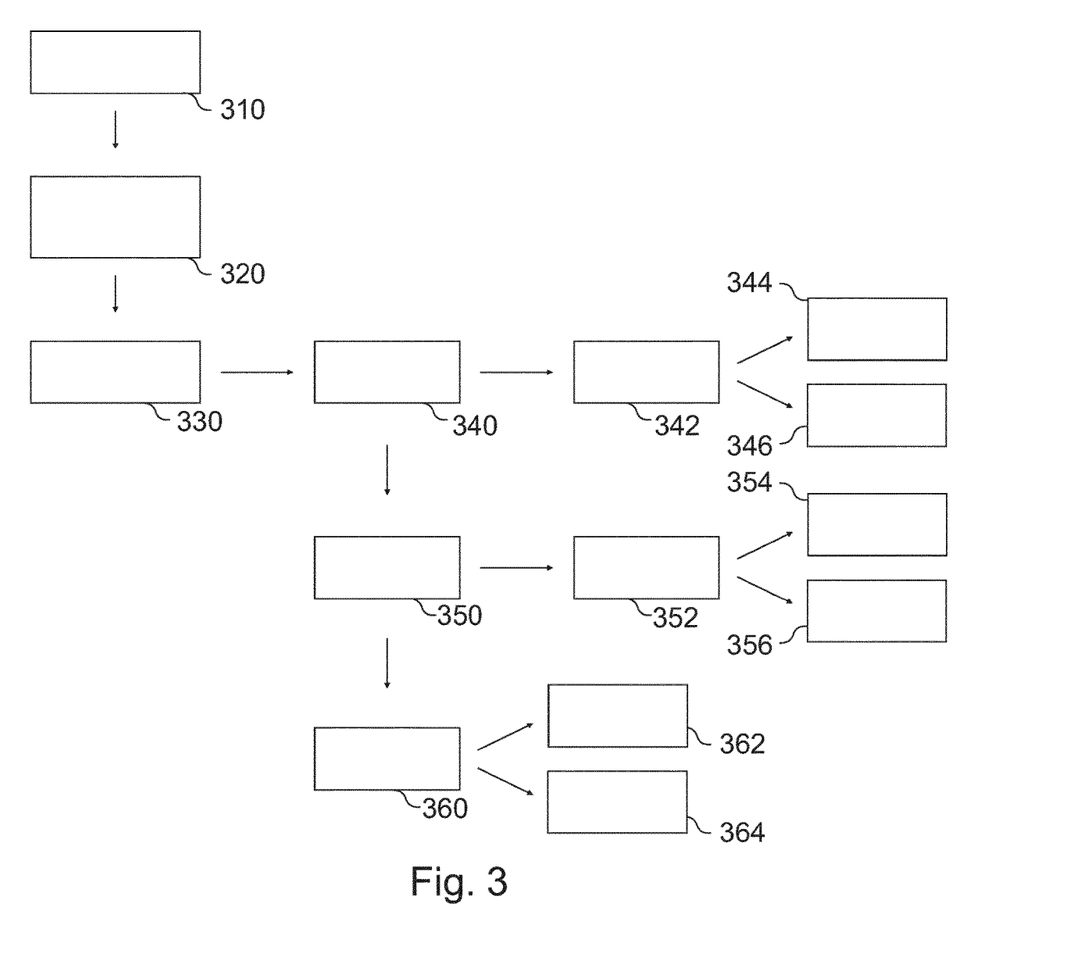
FIG. 3 shows a flow chart of a determination of a range of suitable values.

During operation of the microscope, e.g. during surgery, there may be situations in which the image quality dips for short periods, e.g. as the user blocks the lighting system, or as liquids obstruct the view on the surgical site. In these instances, it might not be appropriate to limit the range of values, as the deterioration of the image quality is temporary, and not permanent. The system may use a "low-pass filtering" process that smooths out such temporary changes in the image quality. For example, the quality indicator may be determined for (e.g. based on and/or using) a plurality of samples of the image data over a window of time (i.e. a predefined time-interval, e.g. five seconds or ten seconds). For example, the plurality of samples may relate to a plurality of frames of the image data that are taken periodically, e.g. using every frame of the image data, using multiple frames every second, using one frame every second etc. The range of values that are suitable in view of the quality indicator may be changed if, within the window of time, enough instances of the quality indicator indicate that a change in the range of values is necessary. In other words, the range of values that are suitable in view of the quality indicator may be limited if, within the plurality of samples within the window of time, a number of samples that yield a quality indicator that lies within the first sub-range, is higher than a threshold value. The range of values that are suitable in view of the quality may be the entire range of values if, within the plurality of samples within the window of time, a number of samples that yield a quality indicator that lies within the at least one second sub-range, is higher than the threshold value. FIG. 3 shows an exemplary flow chart that illustrates how and when a limit to the range of values is being set or disabled.

Once the range of values that are suitable in view of the quality indicator are determined, this range of values may be used to adapt the operation of the microscope. For example, the change of the user settings may be initiated, attempted or triggered by the user of the microscope. In other words, the system may be configured to control a user-initiated change of the one or more user settings based on the range of values that are suitable in view of the quality indicator. The system is configured to control a change of the one or more user settings based on the range of values that are suitable in view of the quality indicator. In other words, the change of the one or more user settings may be controlled, by the system, based on the range of values that are suitable. In general, there are two approaches for controlling such a change of the user settings. In a first approach, the one or more user settings may be restricted to the range of values that are suitable. In other words, the system may be configured to limit the change of the one or more user settings to the range of values that are suitable in view of the quality indicator, e.g. to prevent the user from selecting values that lie outside the range of values that are suitable in view of the quality indicator. Alternatively (or additionally), the user of the microscope may be warned if they intend to change the one or more user settings to a value that lies outside the range of values that are suitable. In other words, the system may be configured to provide a notification via an output device if a change of the one or more user settings outside the range of values that are suitable in view of the quality indicator is attempted. After the notification, the change may either be performed, the change may be rejected as restricted by the system, and/or a delay may be introduced before changing the user settings in which the user may reconsider the change in the user settings. In other words, the system may be configured to delay the change of the one or more user settings when the notification is provided. For example, the system may be configured to request the user to repeat the change of the one or more user settings after the delay, to confirm the change after the delay, or to wait out the delay in order to apply the change of the one or more user settings.

In some cases, two or more different fluorescent dyes are being used on the same sample, e.g. in order to distinguish different systems or blood vessels during surgery. Consequently, the image quality may be considered with respect to the two or more fluorescent dyes, and with respect to the corresponding two or more frequency bands that are indicative of fluorescence emissions of the respective to or more fluorescent dyes. In other words, two or more quality indicators may be determined separately for two or more non-overlapping frequency bands that are indicative of fluorescence emissions, i.e. for portions of the image data that represent the respective frequency bands in the image data. The range of values may be suitable in view of the two or more quality indicators. In other words, the range of values may be identified such, that the range of values is suitable in view of the quality indicators with respect to (all of) the two or more fluorescent dyes and/or two or more non-overlapping frequency bands.

The interface 112 may correspond to one or more inputs and/or outputs for receiving and/or transmitting information, which may be in digital (bit) values according to a specified code, within a module, between modules or between modules of different entities. For example, the interface 112 may comprise interface circuitry configured to receive and/or transmit information. In embodiments the one or more processors 114 may be implemented using one or more processing units, one or more processing devices, any means for processing, such as a processor, a computer or a programmable hardware component being operable with accordingly adapted software. In other words, the described function of the one or more processors 114 may as well be implemented in software, which is then executed on one or more programmable hardware components. Such hardware components may comprise a general-purpose processor, a Digital Signal Processor (DSP), a micro-controller, etc. In at least some embodiments, the one or more storage devices 116 may comprise at least one element of the group of a computer readable storage medium, such as an magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

Figure 4:
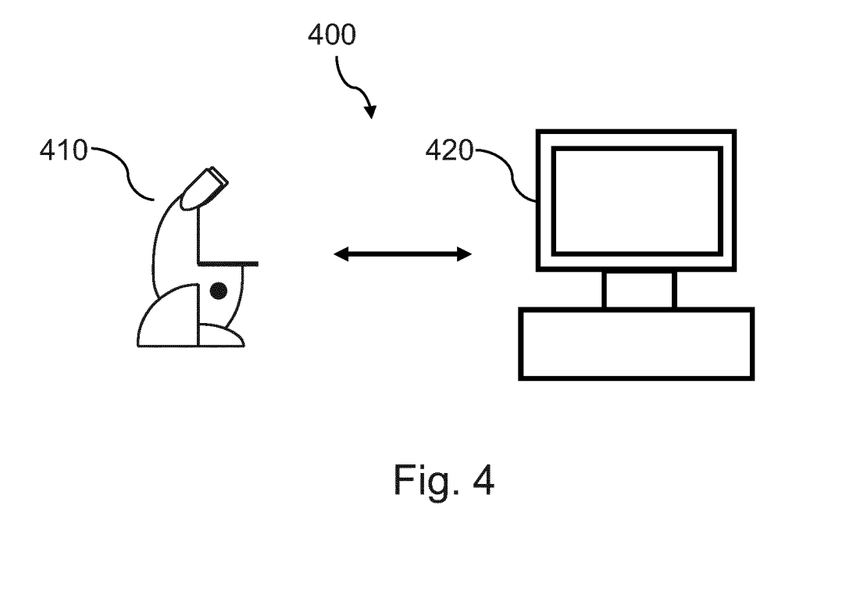
FIG. 4 shows a schematic diagram of a system comprising a microscope and a computer system.

More details and aspects of the system and microscope system are mentioned in connection with the proposed concept or one or more examples described above or below (e.g. FIGS. 2 to 4). The system or microscope system may comprise one or more additional optional features corresponding to one or more aspects of the proposed concept or one or more examples described above or below.

Figure 2:
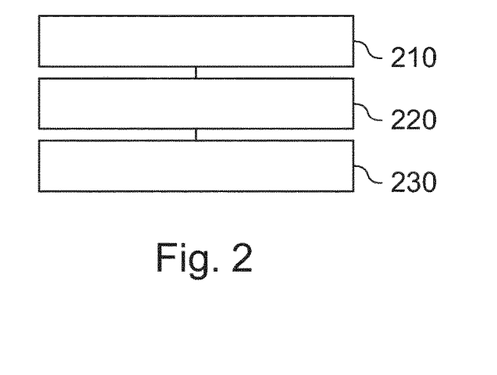
FIG. 2 shows a flow chart of an embodiment of a method for a microscope of a microscope system.

FIG. 2 shows a flow chart of an embodiment of a (corresponding) method 200 for a microscope 120 of a microscope system. The method comprises determining 210 a quality indicator of a quality of image data of a fluorescence imaging sensor 122 of the microscope. The method comprises identifying 220, for one or more user settings of the microscope, a range of values that are suitable in view of the quality indicator. The method comprises controlling 230 a change of the one or more user settings based on the range of values that are suitable in view of the quality indicator. For example, the method may be performed by the microscope system 100, e.g. by the system 110 of the microscope system.

As indicated above, features described in connection with the system 110, the microscope system 100 and the microscope 120 of FIGS. 1a and/or 1b may be likewise applied to the method of FIG. 2.

More details and aspects of the method are mentioned in connection with the proposed concept or one or more examples described above or below (e.g. FIG. 1a, 1b, 3 or 4). The method may comprise one or more additional optional features corresponding to one or more aspects of the proposed concept or one or more examples described above or below.

Various examples of the present disclosure relate to an automated microscope settings control to maintain fluorescence image quality. Various examples may therefore relate to automated settings.

In vascular neurosurgery cases involving the use of the dye indocyanine green (ICG), a fluorescent dye, the fluorescence signal quality is dependent on the different microscope settings (light source intensity, magnification, working distance) in addition to the ICG dosage injected. According to various examples, to dissuade the surgeon from using the settings where the signal might be of low/unacceptable quality, a limit on the microscope's settings range (i.e. the range of values of the user settings) is implemented. In some systems, this limit may be fixed and rigid when set and allow only a limited number of setting combinations that are still dependent on the ICG dosage for fluorescence image quality. This may hamper the practical applicability of the microscope and preclude the use of certain setting combinations that may otherwise provide an acceptable signal.

Various examples of the present disclosures may automate the settings control of the microscope based on the fluorescence signal quality, i.e. the quality of the image data of a fluorescence imaging sensor. The microscope settings range, i.e. the range of values of the one or more user settings, may be limited if the signal quality is low. This may be done in a dynamic manner and based on the current fluorescence signal, i.e. the image data, and may be automatically adjusted to changing scenarios. No limit might need to be set beforehand. The approach may be independent of the ICG dosage and may allow greater freedom to the surgeon with respect to settings combinations.

Assuming the fluorescence in the field of view is homogenous or approximately homogenous, a fluorescence (FL) parameter (like e.g. a maximal fluorescence intensity) can serve as a good indicator of the fluorescence signal strength, i.e. as quality indicator. This FL parameter, when below a defined threshold value (in the following denoted as ThreshLow), may indicate a negligible fluorescence signal that can be ignored. The FL parameter, when above another defined threshold value (ThreshHigh), may indicate a good fluorescence signal, i.e. that the signal quality is good. If the FL parameter is below ThreshLow or above ThreshHigh, the FL parameter may be in one of the at least one second sub-ranges. In the FL parameter is between ThreshLow and ThreshHigh, the FL parameter may be in the first sub-range. When the FL parameter is consistently between ThreshLow and ThreshHigh, it means the signal might not be of good quality. In such a situation, to prevent the scenario where the user changes the settings that would lead to a worse fluorescence signal, the microscope settings can be limited in the direction of worsening signal quality (for example, by allowing only lower magnification, lower working distance and/or higher illumination intensity than the current values). In other words, this means that the user may be unable to go to a higher magnification, or higher working distance or lower illumination intensity from the current values if the FL parameter is between ThreshLow and ThreshHigh. This may allow the limit to be dynamic and flexible. The FL parameter may be computed after each frame and the settings range limit is enabled or not depending on the current signal quality.

FIG. 3 shows a flow chart of a determination of a range of suitable values. In the determination of the range of suitable values, the FL parameter (FLParam, e.g. maximum fluorescence intensity value) is determined 310, a % FramesLimit (a percentage of frames in the past NumFrames (a rolling window of frames to calculate an average of the FL parameter) where the FLParam is between ThreshLow and ThreshHigh) is updated 320, and AvgFLParam (the average of FLParam over the past NumFrames frames) is calculated/updated 330. AvgFLParam and ThreshLow may be compared 340. If AvgFLParam is smaller than ThreshLow and % FramesLimit is larger than a criteria/criterion (e.g. a minimal value of % FrameLimit required to enable the limit) 342, the limit is disabled 344, if % FrameLimit is at most the criteria, the previous limit status may be kept 346. If AvgFLParam is not smaller than ThreshLow, AvgFLParam and ThreshHigh may be compared 350. If AvgFLParam is larger than ThreshHigh and % FrameLimit is larger than a criteria 352, then the limit may be disabled 354, if % FrameLimit is at most the criteria 352, the previous limit status may be kept 356. If AvgFLParam is not larger than ThreshHigh 350, i.e. if AvgFLParam is between ThreshLow and ThreshHigh, the % FrameLimit and Criteria may be compared 360. If the % FrameLimit is larger than the criteria, the limit may be enabled 362, if not, the previous limit status may be kept 364.

In the following, an illustrative example is given. A user may inject an ICG dosage of 1 mL of 2.5 mg/mL solution. The user may then switch on a mode for visualizing fluorescence images. The working distance is 300 mm, magnification is 8× and illumination is 100%. As the ICG uptake slowly happens, the signal may start to be more visible. As the signal is weak, the settings may be limited, i.e. the user might not be enabled to go beyond 300 mm or 8× magnification or reduce the illumination below 100%. Now, the user may reduce the magnification to 4×. The signal quality is now good, and the limits may be disabled. The user may now reduce the working distance to 250 mm and go to 10× magnification if desired. If at this point the signal is weak, the limits may be enforced, else not. This approach may allow the limits to be decided dynamically on the current situation, which may give more freedom to the surgeon to operate without compromising on the fluorescence signal quality.

The proposed approach is dynamic and may be used in real-time. The limits are dynamic and may be different based on the situation. Various examples may allow for a greater number of settings combinations (including some factors on the extreme ends) to be accessed by the user without compromising on signal quality, providing the surgeon the freedom to work with a greater range of working distance and/or magnification. The settings limit may be automatically adjusted based on the current scenario and might not need to be set beforehand. For example, the approach may be independent of the ICG, or in more general terms, the fluorescent dye, dosage. The approach may account for a varying light flux of the lamp in between microscopes of the same model. The approach may account for photo-bleaching and other time degradation effects on the dye's fluorescing quality. In various examples, the target area may show the dye without any aberrantly high FL signal pixels. The defined thresholds may be computed carefully.

Some embodiments relate to a microscope comprising a system as described in connection with one or more of the FIGS. 1 to 3. Alternatively, a microscope may be part of or connected to a system as described in connection with one or more of the FIGS. 1 to 3. FIG. 4 shows a schematic illustration of a system 400 configured to perform a method described herein. The system 400 comprises a microscope 410 and a computer system 420. The microscope 410 is configured to take images and is connected to the computer system 420. The computer system 420 is configured to execute at least a part of a method described herein. The computer system 420 may be configured to execute a machine learning algorithm. The computer system 420 and microscope 410 may be separate entities but can also be integrated together in one common housing. The computer system 420 may be part of a central processing system of the microscope 410 and/or the computer system 420 may be part of a subcomponent of the microscope 410, such as a sensor, an actor, a camera or an illumination unit, etc. of the microscope 410.

The computer system 420 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 420 may comprise any circuit or combination of circuits. In one embodiment, the computer system 420 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 420 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 420 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 420 may also include a display device, one or more speakers, and a keyboard and/or controller, which can include a mouse, trackball, touch screen, voice-recognition device, or any other device that permits a system user to input information into and receive information from the computer system 420.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

LIST OF REFERENCE SIGNS

100 Microscope system
105 Base unit
110 System
112 Interface
114 One or more processors
116 One or more storage devices
120 Microscope
122 Fluorescence imaging sensor
130 Display
140 Arm
150 Steering handles
200 Method
210 Determining a quality indicator
220 Identifying a range of values
230 Controlling a change of one or more user settings
310 A fluorescence parameter, FLParam, is determined
320 A frames limit, % FramesLimit, is updated
330 AvgFLParam is calculated
340 AvgFLParam and ThreshLow are compared
342 % FrameLimit and Criteria are compared
344 Limit is disabled
346 Limit status is kept
350 AvgFLParam and ThreshHigh are compared
352 % FrameLimit and Criteria are compared
354 Limit is disabled
356 Limit status is kept
360 % FrameLimit and Criteria are compared
362 Limit is enabled
364 Limit status is kept
400 System
410 Microscope
420 Computer system

The invention claimed is:

1. A system for a microscope of a microscope system, the system comprising one or more processors and one or more storage devices, wherein the system is configured to:
    determine a quality indicator of a quality of image data of a fluorescence imaging sensor of the microscope;

identify, for one or more user settings of the microscope, a range of values that are suitable in view of the quality indicator; and control a change of the one or more user settings, if initiated by a user of the system, based on the range of values that are suitable in view of the quality indicator.

2. The system according to claim 1, wherein the system is configured to limit the change of the one or more user settings to the range of values that are suitable in view of the quality indicator.

3. The system according to claim 1, wherein the system is configured to provide a notification via an output device if a change of the one or more user settings outside the range of values that are suitable in view of the quality indicator is attempted.

4. The system according to claim 3, wherein the system is configured to delay the change of the one or more user settings when the notification is provided.

5. The system according to claim 1, wherein the quality indicator relates to a light intensity of fluorescence emissions within the image data.

6. The system according to claim 5, wherein the quality indicator relates to a maximal light intensity of the fluorescence emissions within the image data, or wherein the quality indicator relates to an average light intensity of the fluorescence emissions within the image data.

7. The system according to claim 1, wherein the quality indicator is defined over a range of values, wherein the range of values comprises a first sub-range and at least one second sub-range outside the first sub-range, wherein the range of values that are suitable in view of the quality indicator is limited if a value of the quality indicator is within the first sub-range.

8. The system according to claim 7, wherein the entire range of values is accessible for the one or more user settings if the value of the quality indicator is within the at least one second sub-range.

9. The system according to claim 7, wherein the quality indicator is determined for a plurality of samples of the image data over a window of time, and wherein the range of values that are suitable in view of the quality indicator is limited if, within the plurality of samples within the window of time, a number of samples that yield a quality indicator that lies within the first sub-range, is higher than a threshold value.

10. The system according to claim 7, wherein the first sub-range is located between two second sub-ranges within the range of values.

11. The system according to claim 1, wherein two or more quality indicators are determined separately for two or more non-overlapping frequency bands that are indicative of fluorescence emissions, wherein the range of values is suitable in view of the two or more quality indicators.

12. The system according to claim 1, wherein the one or more user settings relate to one or more of a magnification factor of the microscope, a working distance of the microscope and a brightness of an illumination system of the microscope.

13. The system according to claim 1, wherein the range of values that are suitable in view of the quality indicator are suitable with regards to image processing being performed on the image data and/or with regards to a visualization of the image data on an output device.

14. A method for a microscope of a microscope system, the method comprising:

determining a quality indicator of a quality of image data of a fluorescence imaging sensor of the microscope;

identifying, for one or more user settings of the microscope, a range of values that are suitable in view of the quality indicator; and controlling a change of the one or more user settings, if initiated by a user of the system, based on the range of values that are suitable in view of the quality indicator.

15. A non-transitory, computer-readable medium comprising a program code that, when the program code is executed on a processor, a computer, or a programmable hardware component, causes the processor, computer, or programmable hardware component to:

determine a quality indicator of a quality of image data of a fluorescence imaging sensor of the microscope;

identify, for one or more user settings of the microscope, a range of values that are suitable in view of the quality indicator; and control a change of the one or more user settings, if initiated by a user of the system, based on the range of values that are suitable in view of the quality indicator.

* * * * *